May 5, 1959  S. E. M. NORLINDH  2,885,046
EMERGENCY RELEASE COUPLING

Filed Aug. 29, 1955  2 Sheets-Sheet 1

Inventor
Sven Erik Malte Norlindh
by Pierce, Scheffler & Parker
attys

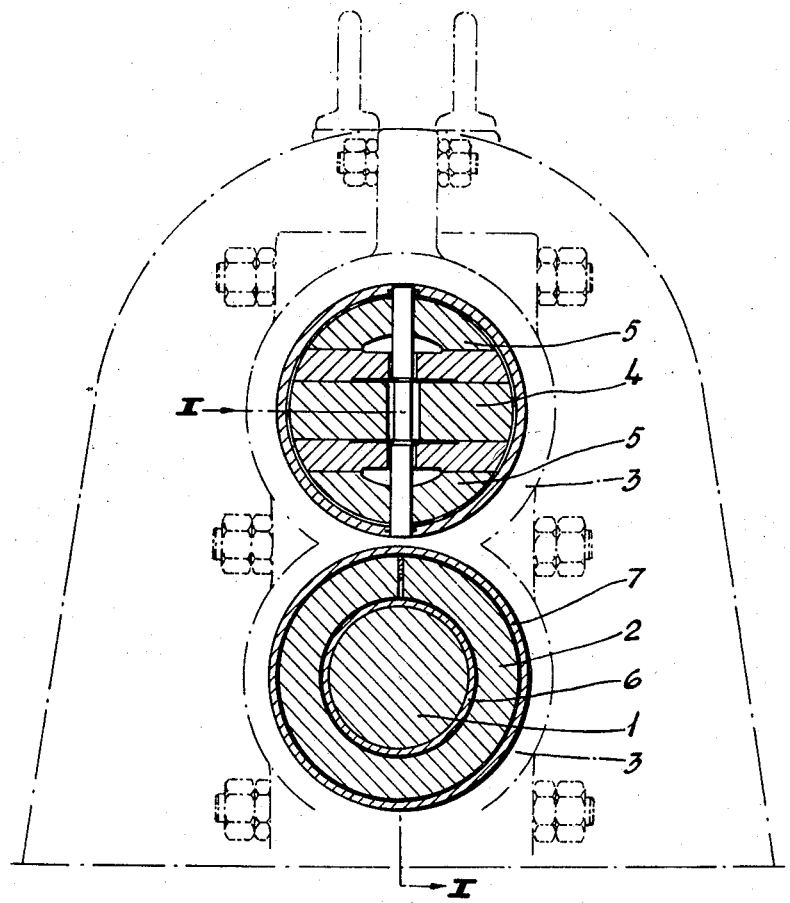

United States Patent Office 2,885,046
Patented May 5, 1959

2,885,046

EMERGENCY RELEASE COUPLING

Sven Erik Malte Norlindh, Morgårdshammar, Sweden, assignor to Morgårdshammars Mekaniska Verkstads AB, Morgårdshammar, Sweden Application August 29, 1955, Serial No. 531,063

3 Claims. (Cl. 192—56)

To protect parts of machinery against overload causing damage to essential details, emergency or overload release couplings are used—i.e., so-called break couplings, break discs etc.—between a driving and a driven part. The functioning of these is based on allowing a weaker part to break at overload. According to experience, however, such a part is often subject to fatigue, which, after a certain time, causes it to break at considerably lower loads than foreseen.

The present invention relates to an overload (emergency) release coupling intended to avoid fatigue breaks and to make it possible to alter the strength of the breaking joints continually. The invention is characterized by the provision of a conical shrink joint of such nature that the coupling is released at overload without causing seizing (jamming) and thereafter the parts of the coupling are kept apart at least as long as the overload lasts. The coupling in question can be applied for torsion joints (joints transmitting torque) as well as joints transmitting tensile and compressive forces.

During a good many decades considerable work has been devoted to the solution of the problems connected with the necessary breaking joints, particularly regarding rolling mill technique. The most difficult problem has been to make a breaking joint on each outgoing pinion neck. Between motor and pinion gear a coupling with break bolts has been used exclusively in the past, and these bolts have been sheared off when overloaded. This causes one or two rolls to obtain too high a torque, whereby rolls and universal couplings break without the bolts in the main coupling being sheared off. On the other hand, the bolts of the main coupling have often been broken as a result of fatigue, or due to the occurrence of torsion strains, not dangerous to the machinery, on e.g. three rolls simultaneously (in three-high mills). Especially in blooming mills this has caused the glowing ingots to stop between the rolls and has caused heat cracks resulting in roll breaks. The radial space for universal or wobbler couplings between the pinion stand and the roll stands has not allowed any breaking joints of conventional design because of the high torque.

During the last seven years, universal couplings for rolling mills have been made for shrinking on round pinion and roll necks with a cone of 1:30. At overload the coupling head turns on the neck, whereby both parts stick together, and the coupling head seizes the neck and cannot be dismounted.

However, if the shrinking joint is made with a cone of approx. 1:12 and with a sleeve of cast iron or similar, which by means of silicon carbide powder or shrinking is prevented from turning round the neck, at overload such a quick sliding in axial direction (abt. 45° spiral) is obtained that the heat generation will be unimportant and the surfaces of the joint remain undamaged. In order to prevent, after overload, the shrinking surfaces from sliding upon each other, springs are fitted therebetween to keep the shrinking surfaces apart.

The coupling head stops rotating and may rest in an outer sleeve enclosing the coupling head while the neck may continue to rotate. Another equally difficult problem, however, has been to make an overload break joint for use in rolls, shears, screw-presses, and other heavy machinery. My invention provides a conical joint for compressive or tensile forces which successfully meets the above problems.

The invention is described in detail in connection with several examples of design set forth in the following description, and illustrated in the enclosed drawings.

Figs. 1 and 2 show sections through a breaking joint applied to universal couplings for rolling mills. Fig. 1 shows a section along the line I—I in Fig. 2, and Fig. 2 a section along the line II—II in Fig. 1.

Figure 1:
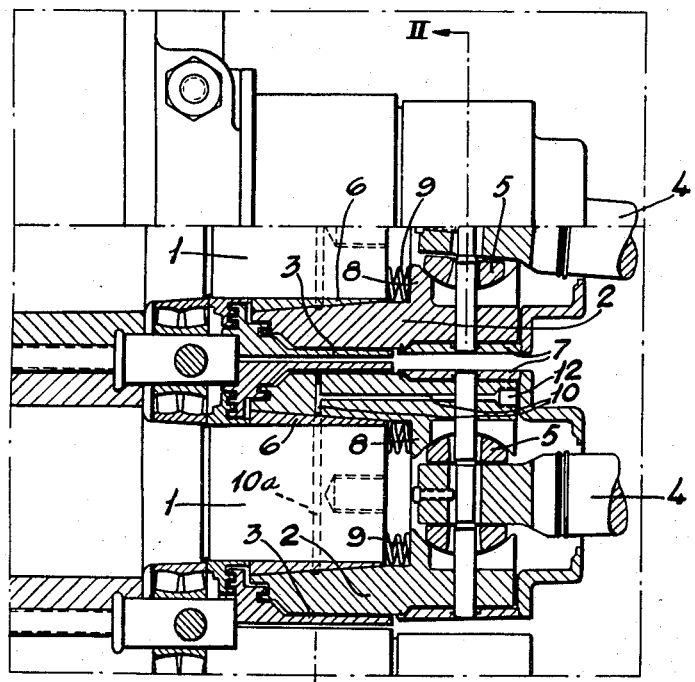

According to the examples of Figs. 1 and 2, the invention is applied on the outgoing pinion necks protecting each roll against overload.

In Fig. 1 only a small part of the pinion stand is shown on the left side. 1 indicates the pinion necks on which the couplings are fitted. 2 indicates the coupling head and 3 a non-rotative fixed sleeve enclosing same. 4 indicates the coupling spindles. The coupling itself is a universal coupling and its slide metals are indicated by 5. The details of this coupling are passed over here as they do not form a part of the invention.

According to the invention the overload release coupling is now arranged as follows: A sleeve 6, suitably of cast iron, is shrunk on to each of the outgoing pinion necks 1. This sleeve is slightly conical in direction from the roll. The cone is at least 1:30. On this sleeve the coupling head provided with a corresponding inner cone, is shrunk and around its inner end part the sleeve 3 is situated, which at the same time serves as labyrinth seal for the pinion bearings. Around the outer end part a sleeve 7 is situated and between a flange 8 in the coupling head and the roller (pinion) neck a spring 9 is inserted. 10 indicates a system of canals for introduction of liquid under pressure, suitably oil, between the conical surfaces and 10a indicates an annular passage provided in the inner periphery of the member fitted upon the conical sleeve 6. As an alternative to the standard heat means for assembling and disassembling the parts of the shrinkjoint, a suitable pressure pipe (not shown) may be detachably connected with the canal system 10, 10a at the threaded opening 12 to provide hydraulic means for the assembly and dismounting of the coupling head.

At overload the sleeve 6 is sliding in the coupling head 2 and the power transmission is interrupted. The coupling head stops rotating and may rest in the outer sleeve 3 while the neck may continue rotating. Meanwhile the springs 9 keep the coupling parts separated.

When the coupling shall be reassembled the coupling spindle 4 is removed and the coupling head driven up into the coupling position on the sleeve 6 by means of oil injection upon the shrinking surfaces and a jack according to e.g. the Swedish SKF Patent No. 121,560, or also by means of shrinking by heat.

Figure 3:
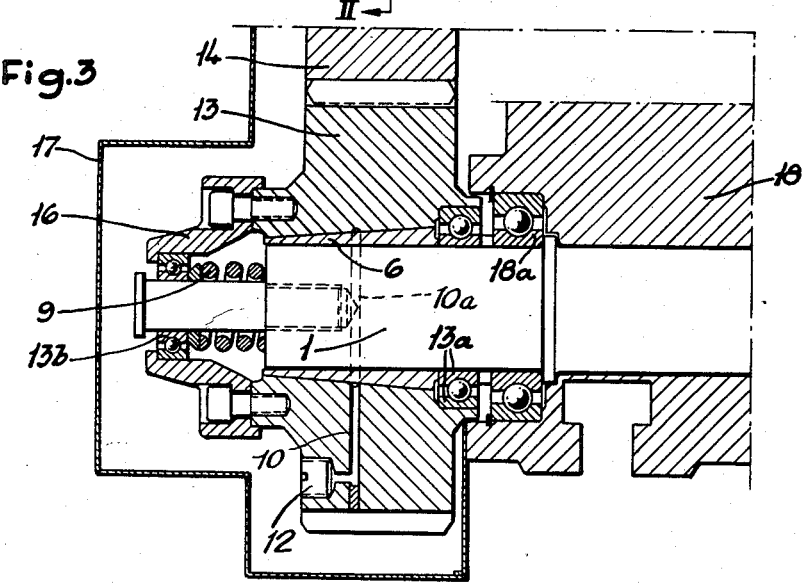
Fig. 3 shows an axial section of another application.

Fig. 3 indicates in principle the same design as Figs. 1 and 2, but in this case the torque is transmitted from the gears 14 and 13 to the shaft 1. Parts with the function and form as in the foregoing figures have the same index numbers. The example is taken from a three-high universal rolling mill where the shaft stops as soon as it is exposed to such a high torque that the shrink joint loosens. The break joint is here arranged in the gear wheel 13, 13a and 13b are ball bearings between the gear wheel 13 and the shaft neck 1, and 18a is a ball bearing between the shaft neck 1 and the bearing box 18 of the roll. The gear wheel 13 is also here kept from the shrink surfaces by means of a spring 9 inserted between the bearing support 16 and the gear wheel 13 and resting against the inner race 13b of the outer ball bearing. The inner sleeve 6 may suitably be shrunk on the shaft, possibly with silicon carbide powder on the shrink surface, increasing the friction so that the inner shrink surface can slide on the shaft neck when the outer shrink joint loosens. The sleeve 6 can of course be omitted and the shaft neck made conical. 17 is a plate cover enclosing all. When the shrink joint breaks at a too high torque the gear wheel 13 is moved by the spring 9 in axial direction avoiding any contact with the sleeve 6, but the gear wheel 13 may rotate on the roller bearings 13a and 13b.

As the strength of the break joint depends on the surface pressure on the shrink surface and the coefficient of friction it is possible to adjust, by means of drive-ups of different strength, the tensile or compressive stresses or the break torque at which the joint shall break. As the coefficient of friction remains almost constant, an exactly adjustable break joint has been obtained, independent of the phenomena of fatigue which hitherto used break couplings and bolts have involved. The overload release couplings according to this invention are especially suitable for rolling mills, presses, shears and for engineering works in general.

Instead of using cast iron as material for the sleeves 6, and the necks 19, respectively, it is possible also to use, for example, hardened or chrome plated steel or some metal alloy. In a suitable manner the most convenient cone angle is determined for various materials.

Having now described my invention, what I claim as new and desire to secure by Letters Patent is:

1. An overload release coupling connecting two axially aligned rotary shafts comprising a conical member secured to one of the shafts, a sleeve member having a conical bore connected to the other of the shafts, said sleeve being releasably connected to said conical member by a shrink joint, and means for urging said conical member and said sleeve apart when said shrink joint is broken by torsional stress upon overload of one of said rotary shafts.

2. An overload release coupling as defined in claim 1, wherein said means for urging said conical members apart includes spring means.

3. An overload release coupling for connecting a first shaft rotatably mounted in bearings with a second shaft arranged end to end collinearly therewith, comprising a conical member secured to the end of said first shaft and tapering toward said second shaft; a coupling head secured to said second shaft, said coupling head having a bore tapering outwardly and cooperating with said conical member to form a shrink joint therewith; and a sealing sleeve enclosing said shrink joint and having an annular portion extending radially inwardly intermediate said coupling head and said shaft bearings, so that when said shrink joint is broken by torsional stress upon overload of said shaft coupling, said sealing sleeve also serves as a supporting sleeve for the coupling head.

References Cited in the file of this patent
UNITED STATES PATENTS
2,236,854   Ocenasek _____ Apr. 1, 1941
FOREIGN PATENTS
660,295   France _____ Feb. 18, 1929